United States Patent
Katayama (10) Patent No.: US 8,549,766 B2
(45) Date of Patent: Oct. 8, 2013

(54) RACK EXTENSION JIG DEVICE

(75) Inventor: Yoshitake Katayama, Aichi (JP)

(73) Assignee: Kamoseiko Kabushiki Kaisha, Aichi (JP)

( * ) Notice: Subject to any disclaimer, the term of this patent is extended or adjusted under 35 U.S.C. 154(b) by 214 days.

(21) Appl. No.: 13/186,846

(22) Filed: Jul. 20, 2011

(65) Prior Publication Data

US 2012/0240422 A1     Sep. 27, 2012

(30) Foreign Application Priority Data

Mar. 23, 2011   (JP) ................................. 2011-064648

(51) Int. Cl.
 *B25B 11/00*  (2006.01)
 *G01B 3/30*  (2006.01)

(52) U.S. Cl.
 USPC .......................................... 33/613; 33/501.11

(58) Field of Classification Search
 USPC .................. 33/501.11, 501.13, 533, 613, 645
 See application file for complete search history.

(56) References Cited

U.S. PATENT DOCUMENTS

| | | | |
|---|---|---|---|
| 2,638,676 A * | 5/1953 | Callahan | 33/412 |
| 3,718,052 A | 2/1973 | Barr et al. | |
| 4,958,814 A * | 9/1990 | Johnson | 269/43 |
| 6,023,989 A | 2/2000 | Imase et al. | |
| 6,070,336 A * | 6/2000 | Rodgers | 33/613 |
| 6,385,859 B1 * | 5/2002 | Varney | 33/613 |
| 6,658,753 B2 * | 12/2003 | Tatarnic | 33/613 |
| 7,594,340 B2 * | 9/2009 | Xedis, IV | 33/613 |
| 7,730,627 B2 * | 6/2010 | Mashue et al. | 33/501.7 |
| 7,905,029 B2 * | 3/2011 | Allert et al. | 33/533 |
| 8,191,335 B2 * | 6/2012 | Davis | 52/749.1 |

FOREIGN PATENT DOCUMENTS

| | | |
|---|---|---|
| EP | 0851150 A1 | 7/1998 |
| JP | 8-34354 | 2/1996 |
| JP | 10-184842 | 7/1998 |
| JP | 2000-65176 | 3/2000 |

OTHER PUBLICATIONS

Extended European Search Report issued in corresponding European Patent Application No. 11171194.1 dated Jun. 14, 2012.

* cited by examiner

*Primary Examiner* — Christopher Fulton
(74) *Attorney, Agent, or Firm* — Morgan, Lewis & Bockius LLP (57) ABSTRACT

In a rack extension jig device 9, a protracted direction E of tooth projections 12-14 and an elevational direction H of racks 7, 8 are placed in a coplanar position G. This makes it possible to positively engage the tooth projections 12-14 with the respective rack teeth 7, 8 and half tooth surfaces 7c, 8c so as to set a predetermined pitch interval T at a contact portion between the neighboring racks 7, 8 by only pushing the tooth projections 12, 13, 14 against roots 7d, 8d of the respective rack teeth 7, 8 in perpendicular to the roots 7d, 8d, thereby making a rack-adding work easy, quick and user-friendly.

5 Claims, 7 Drawing Sheets

RACK EXTENSION JIG DEVICE

BACKGROUND OF THE INVENTION

1. Field of the Invention

The present invention relates to a rack extension jig device which is used to add a rack or racks when aligning a plurality of racks straight along a lengthwise direction of the racks, and particularly concerns to a rack extension jig device improved so that the rack or racks are added quickly with a single operation.

2. Description of Related Art

A rack combined with a pinion has been known as a rack-and-pinion type steering device or a rack-and-gear device as disclosed by Japanese Laid-open Patent Application Nos. 08-34354, and 2000-65176 (each referred to as first and second reference hereinafter).

The first reference teaches that a helical spring is used as an urging means to absorb a displacement of the rack through a rotational movement of a rack guide means when a distance between the rack and the pinion fluctuates so as to reduce a frictional quantity of the rack guide means during the operation.

The second reference teaches that an elastic member is provided at a position lower than an addendum flank of the gear is placed. When the device is actuated, the gear is brought into engagement with the rack through an urging force of an intermediary elastic member so as to mitigate an induced level of noise and vibration.

Japanese Laid-open Patent Application No. 10-184842 (referred to as third reference hereinafter) teaches that racks are applied to a pinion device which requires a lengthened stroke upon transferring a factory robot, a component part stocker or a washing line.

Figure 14:
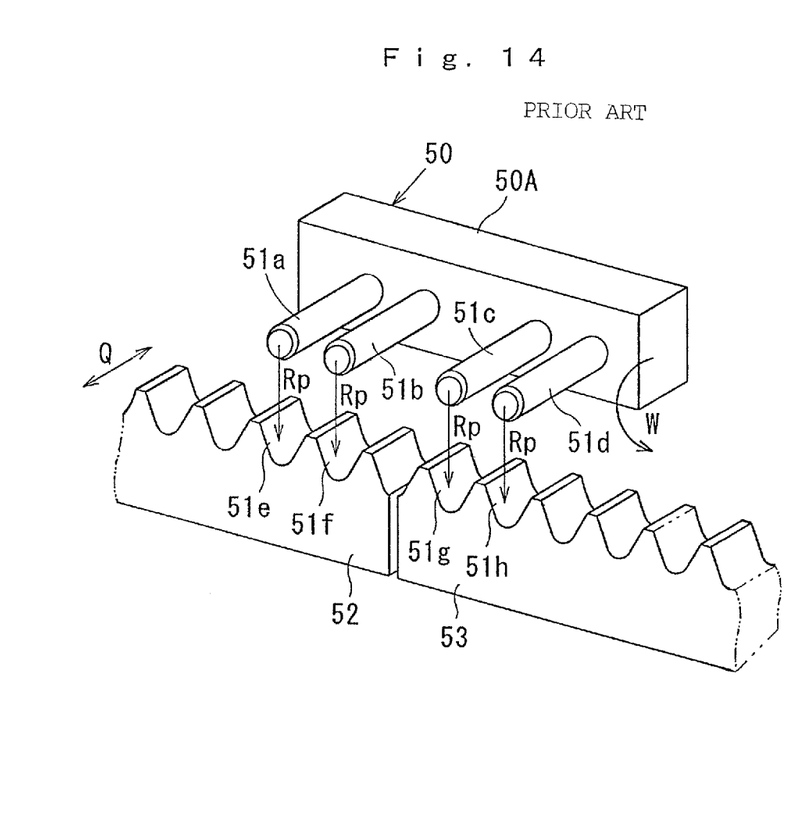
FIG. 14 is a perspective view of a prior rack extension jig tool used to align the neighboring racks straight.

In this instance, a new rack or racks are add when aligning a plurality of racks straight along a lengthwise direction of the racks as shown in FIG. 14.

Figure 15:
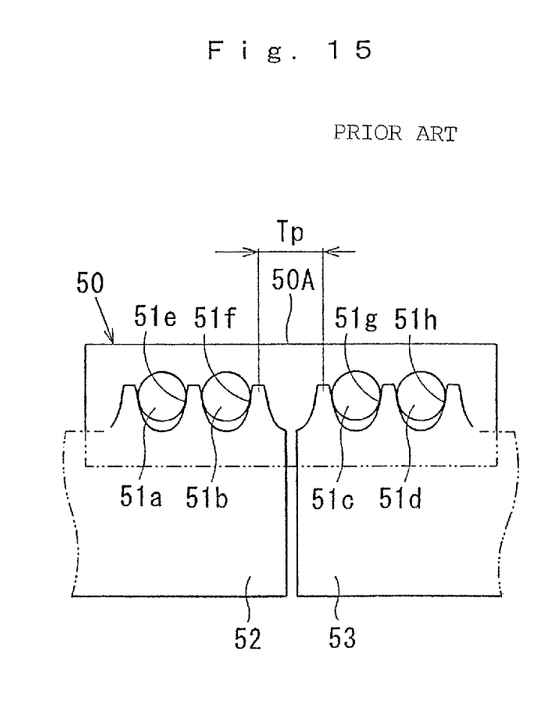
FIG. 15 is a plan view of the prior rack extension jig tool used to align the neighboring racks straight when adding one rack to an array of racks.

In FIG. 14, a rack extension jig tool 50 has a hand grip body 50A, a lateral side of which has a plurality of pins 51a-51d directed along a tooth ridge Q of racks 52, 53. As shown in FIG. 15, the pins 51a-51d are handled to bring the pins 51a-51d into engagement with the respective rack teeth 51e-51h, so as to align the racks 52, 53 straight at the predetermined pitch interval Tp therebetween.

Since the pins 51a-51d are supported by the hand grip body 50A in a canti-lever fashion, it is necessary to use the hand grip body 50A to strongly engage the pins 51a-51d with the respective rack teeth 51e-51h when adding the rack to align straight.

Namely, the rack extension jig tool 50 requires a user to rotationally urge the pins 51a-51d toward the respective rack teeth 51e-51h with an assist of a rotational moment W. This makes the user cumbersome to operate the hand grip body 50A, which hinders the rack extension jig tool 50 to be user-friendly. The cumbersome operation renders the rack extension jig tool 50 difficult to readily and smoothly engage the pins 51a-51d with the respective rack teeth 51e-51h with a single operation.

Therefore, the present invention has been made with the above drawbacks in mind, it is a main object of the invention to provide a rack extension jig device which is capable of readily and positively engaging tooth projections with the respective rack teeth to make a rack-adding operation quick and user-friendly with a single operation when adding a rack or racks to an array of other racks.

SUMMARY OF THE INVENTION

According to the present invention, there is provide a rack extension jig device which is used to add a rack or racks so as to align a plurality of racks straight along a lengthwise direction of the racks. The rack extension jig device has a hand grip body provided to have at least two tooth projections including a front tooth projection and a rear tooth projection.

The front tooth projection engages with a tooth surface of one rack, and the rear tooth projection engages with a tooth surface of another rack among two neighboring racks. The tooth projections are directed in a coplanar relationship with each elevational direction of the racks when the racks are aligned straight in which the tooth projections engage with the respective racks so as to determine a pitch interval among the neighboring racks.

The hand grip body has an adjustment side plate which engages with elevational sides of the neighboring racks at the contact portion between the neighboring racks upon aligning the racks straight.

With the adjustment side plate engaged with the elevational sides of the neighboring racks, it becomes possible to rectify the neighboring racks to stably align straight upon pushing the hand grip body against the contact portion between the neighboring racks.

With the tooth projections directed in the coplanar relationship with each elevational direction of the racks, it is possible to positively make the tooth projections engage with the respective rack teeth so as to set the predetermined pitch interval at the contact portion between the neighboring racks only by pushing the tooth projections against roots of the respective rack teeth in perpendicular to their roots.

This makes it possible to quickly align the plurality of racks straight at the normal pitch interval at the contact portion between the neighboring racks, thereby making the rack-adding operation easy and user-friendly.

This is contrasted with the related art in which the hand grip body has to be operated to push the pins urgingly against the roots of the respective racks with the assist of the rotational moment.

According to other aspect of the present invention, the hand grip body has an intermediate tooth projection between the front tooth projection and the rear tooth projection. The front tooth projection, the intermediate tooth projection and the rear tooth projection are each directed in a coplanar relationship with each elevational direction of the racks when the racks are aligned straight. The intermediate tooth projection engages with the neighboring racks at the contact portion between the neighboring racks when aligned straight.

With the intermediate tooth projection positioned at the contact portion between the neighboring racks, the intermediate tooth projection serves to locate the neighboring racks in place. This obviates the need of manually adjusting the neighboring racks upon aligning the racks straight, so as to make the rack-adding operation remarkably easy with a single operation.

According to other aspect of the present invention, both elevational sides of the hand grip body have a mortise groove provided in a direction perpendicular to the lengthwise direction of the neighboring racks, and the adjustment side plate has a tenon ridge slidably placed in the mortise groove.

With the adjustment side plate secured by placing the tenon ridge slidably in the mortise groove, it is possible to make the adjustment side plate cost-effective with a simplified structure.

According to other aspect of the present invention, an elastic member is provided between an upper portion of the adjustment side plate and an upper portion of the hand grip body, so that the adjustment side plates elastically sandwich the neighboring racks at the contact portion between the neighboring racks even when a thickness of the rack is greater than a thickness of the hand grip body.

With the elastic member provided between the adjustment side plate and the hand grip body, the adjustment side plates deform the elastic member to urgingly engage with the neighboring racks at the contact portion between the neighboring racks.

According to other aspect of the present invention, each of the front tooth projection, the intermediate tooth projection and the rear tooth projection have elevational sides to serve as engagement tabs which engage with the respective sides of the neighboring racks at the contact portion between the neighboring racks so as to align the neighboring racks straight.

With the engagement tabs provided on the tooth projections, it is possible to positively align the neighboring racks automatically straight concurrently when pushing the hand grip body against the racks. By visually observing that the engagement tabs engage with the respective elevational sides of the neighboring racks, it is possible to confirm that the racks are aligned straight at the predetermined pitch interval at the contact portion between the neighboring racks.

BRIEF DESCRIPTION OF THE DRAWINGS

A preferred form of the present invention is illustrated in the accompanying drawings in which.

DETAILED DESCRIPTION OF PREFERRED EMBODIMENTS

In the following description of the depicted embodiments, the same reference numerals are used for features of the same type. Positions and directions of the various members are used to correspond to right-left sides, and up-down sides of the attached drawings throughout each embodiment of the invention.

Figure 1:
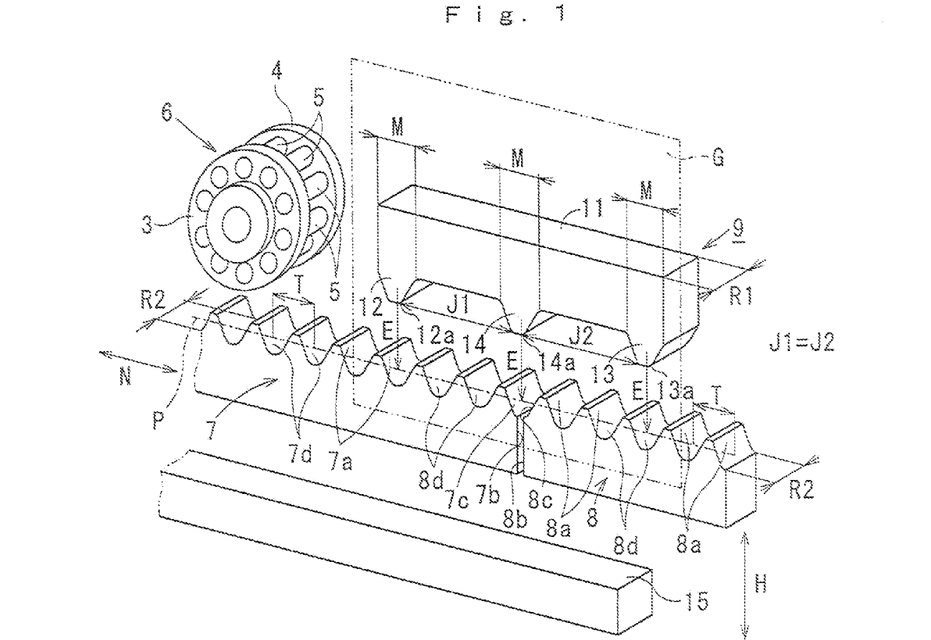
FIG. 1 is a perspective view of a rack, a pin-pinion and a rack extension jig device according to a first embodiment of the invention.
Figure 2:
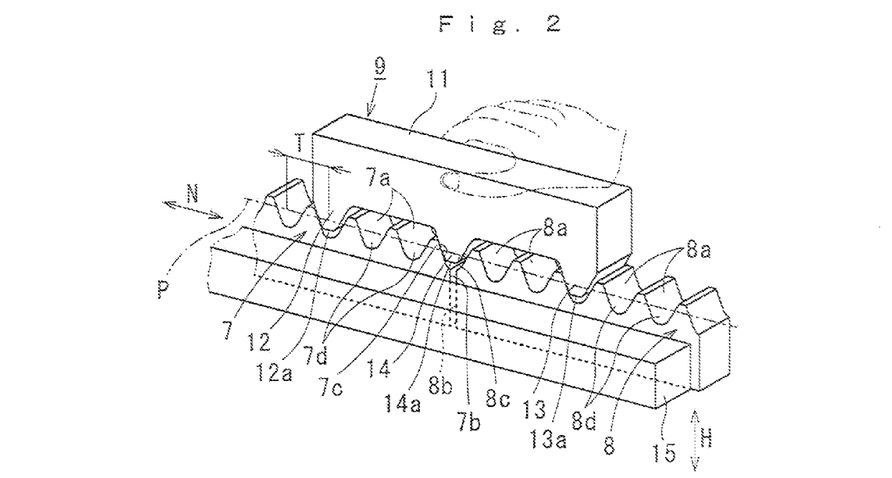
FIG. 2 is a perspective view of the rack extension jig device used to align neighboring racks straight.

Referring to FIGS. 1 and 2 in which a rack extension jig device 9 is provided to connectedly align racks 7, 8 straight along a lengthwise direction of the racks 7, 8. The racks 7, 8 are employed to a long-distance transference when running a factory robot along a lengthened stroke, carrying a component part stocker, moving a washing line or conveying various types of machine tools.

A pin-pinion 6 is provided to engage with the racks 7, 8. The pin-pinion 6 has a plurality of pins 5 provided between two disc plates 3, 4.

Each of the racks 7, 8 has a lengthwise dimension, and having rack teeth 7a, 8a along a pitch line P defined at a predetermined pitch interval T. For the sake of convenience, only two racks 7, 8 are provided in the first embodiment of the invention. However, three of more racks are usually employed to an array of racks depending on the usage of the racks. The racks 7, 8 have the lengthwise dimension of e.g., 1.0 m to 2.0 m at the longest size used for transferring razor-thin sheets of glass applied to a large-scale liquid-crystal display.

The rack extension jig device 9 has a hand grip body 11 which is formed into a bar-shaped configuration. The hand grip body 11 has at least a right end and a left end on which a front tooth projection 12 and a rear tooth projection 13 are respectively formed as tooth projections.

In the middle portion of the hand grip body 11, formed is an intermediate tooth projection 14 protracted in the same direction E as the front and rear tooth projections 12, 13 are oriented.

These tooth projections 12, 13, 14 are protracted in the direction E to be in a coplanar relationship, i.e., coplanar position G with each elevational direction H of the racks 7, 8 when the racks 7, 8 are aligned straight by bringing the tooth projections 12, 13, 14 into engagement with the respective racks 7, 8 so as to determine the pitch interval T among the two neighboring racks 7, 8.

Each thickness M of the tooth projections 12, 13, 14 is predetermined to correspond to the pitch interval T provided between the rack teeth 7a, 8a.

The tooth projections 12, 13, 14 have protracted ends 12a, 13a, 14a each arcuately curved to correspond to surfaces of the rack teeth 7a, 8a. A face-to-face distance J1 between a left side surface of the protracted end 12a and a right side surface of the protracted end 14a, is equal to a face-to-face distance J2 between a left side surface of the protracted end 14a and a right side surface of the protracted end 13a. The face-to-face distances J1, J2 are equal to a multiple value of the pitch interval T of the rack teeth 7a, 8a.

Upon adding the one rack 7 to the adjacent rack 8, the racks 7, 8 are aligned along a linear base beam 15 to meet a right end surface 7b of the rack 7 with a left end surface 8b of the rack 8, so that a half tooth surface 7c of the rack tooth 7a closely encounter a half tooth surface 8c of the rack tooth 8a.

Then, the hand grip body 11 is pushed against roots 7d, 8d of the rack tooth 7a, 8a along the elevational direction H perpendicular to the roots 7d, 8d of the rack tooth 7a, 8a as shown in FIG. 2. This brings the protracted end 14a into engagement with the half tooth surfaces 7c, 8c of the rack tooth 7a, 8a, while and at the same time, bringing the other protracted end 12a (13a) into engagement with the rack tooth 7a (8a).

In this situation, the protracted end 14a adjusts to set the pitch interval T between the half tooth surfaces 7c, 8c so as to align the racks 7, 8 straight in its lengthwise direction N. After aligning the racks 7, 8 straight, the racks 7, 8 are fixedly secured to the linear base beam 15 by means of a screw or a securement bolt (not shown), so as to maintain an array of the racks 7, 8 straight. After setting the array of the racks 7, 8 straight, the hand grip body 11 is taken from the racks 7, 8 so as to drive the pin-pinion 6 to run along the racks 7, 8.

With the structure thus described, the protracted direction E of the tooth projections 12, 13, 14 and the elevational direction H of the racks 7, 8 are placed in the coplanar position G.

As a consequence, the rack-adding operation makes it possible to positively engage the tooth projections 12, 13, 14 with the respective rack teeth 7, 8 and the half tooth surfaces 7c, 8c, thereby setting the pitch interval T at the contact portion between the neighboring racks 7, 8 only by pushing the tooth projections 12, 13, 14 against roots 7d, 8d of the respective rack teeth 7, 8.

This makes it possible to quickly align the plurality of racks 7, 8 straight at the pitch interval T at the contact portion between the neighboring racks 7, 8, thereby making the rack-adding operation easy and user-friendly.

This is contrasted with the related art in which the hand grip body has to be operated to push the pins urgingly against the roots of the respective racks with the assist of the rotational moment.

Especially, with the intermediate tooth projection 14 brought into engagement with the half tooth surfaces 7c, 8c between the neighboring racks 7, 8, it is possible to align the racks 7, 8 in position with a single operation.

Namely, since the intermediate tooth projection 14 plays a part of placing the neighboring racks 7, 8 in position, it is possible to obviate the need of positionally adjusting the racks 7, 8 so as to finish the rack-adding operation with a single procedure, whereby remarkably improving a rack-adding working efficiency upon adding the racks to extend an entire length of the racks.

Figure 3:
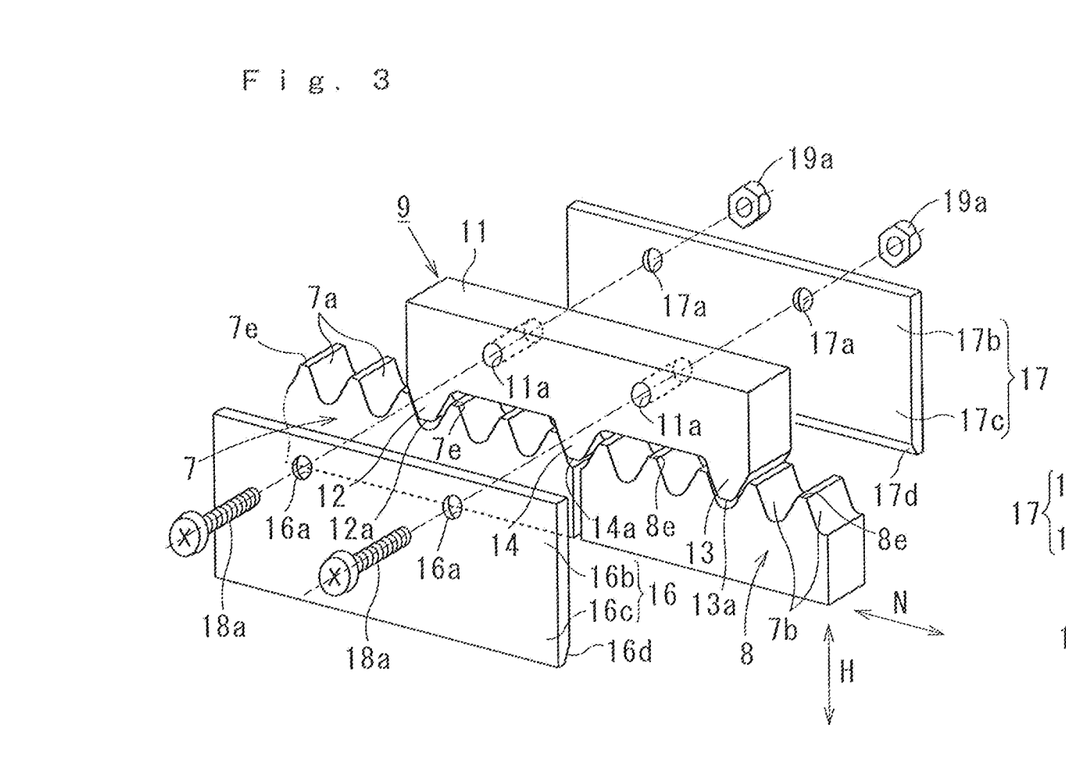
FIG. 3 is a perspective view of the rack extension jig device used to align the neighboring racks straight according to a second embodiment of the invention.
Figure 4:
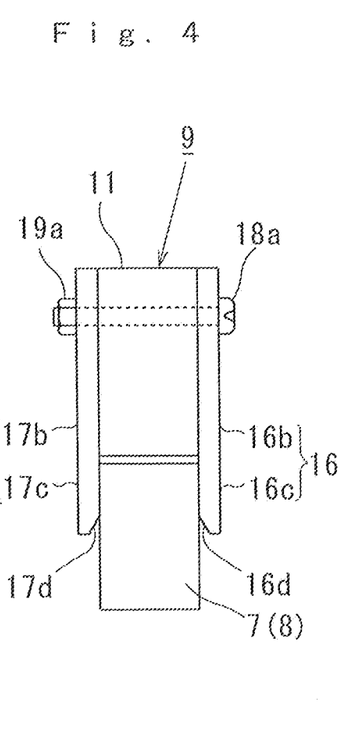
FIG. 4 is a side elevational view of the rack extension jig device.

FIGS. 3 and 4 show a second embodiment of the invention in which a pair of adjustment side plates 16, 17 is provided and formed into a rectangular configuration.

The adjustment side plates 16, 17 are placed to position at the respective elevational sides of the hand grip body 11 in order to obviate the need of the linear base beam 15.

As shown in FIG. 3, the hand grip body 11 has perforation holes 11a at the right and left side, and each of the adjustment side plates 16, 17 has securement holes 16a (17a) corresponding to the perforation holes 11a. Securement bolts 18a are used to pass through the respective securement holes 16a, the perforation holes 11a and the securement holes 17a.

After passing the bolts 18a through the respective holes 16a, 11a, 17a, the bolts 18a are tightened against respective nuts 19a to secure the adjustment side plates 16, 17 to the respective sides of the hand grip body 11.

This makes it possible to fixedly place upper portions of the adjustment side plates 16, 17 to the respective sides of the hand grip body 11, while at the same time, engaging lower portions of the adjustment side plates 16, 17 with the racks 7, 8, so that the racks 7, 8 are adjustedly aligned straight in the lengthwise direction N.

Each of the adjustment side plates 16, 17 has a lower end, an inner side edge of which is bevelled to have guide portions 16d, 17d, thereby making it ready to slide the adjustment side plates 16, 17 smoothly against respective upper ends 7e, 8e of the racks 7, 8 when pushing the adjustment side plates 16, 17 against the contact portion between the neighboring racks 7, 8 as shown in FIG. 4.

With the adjustment side plates 16, 17 engaged against the respective elevational sides of the neighboring racks 7, 8, it becomes possible to rectify the neighboring racks 7, 8 to stably align straight upon pushing the hand grip body 11 against the contact portion between the neighboring racks 7, 8.

Figure 5:
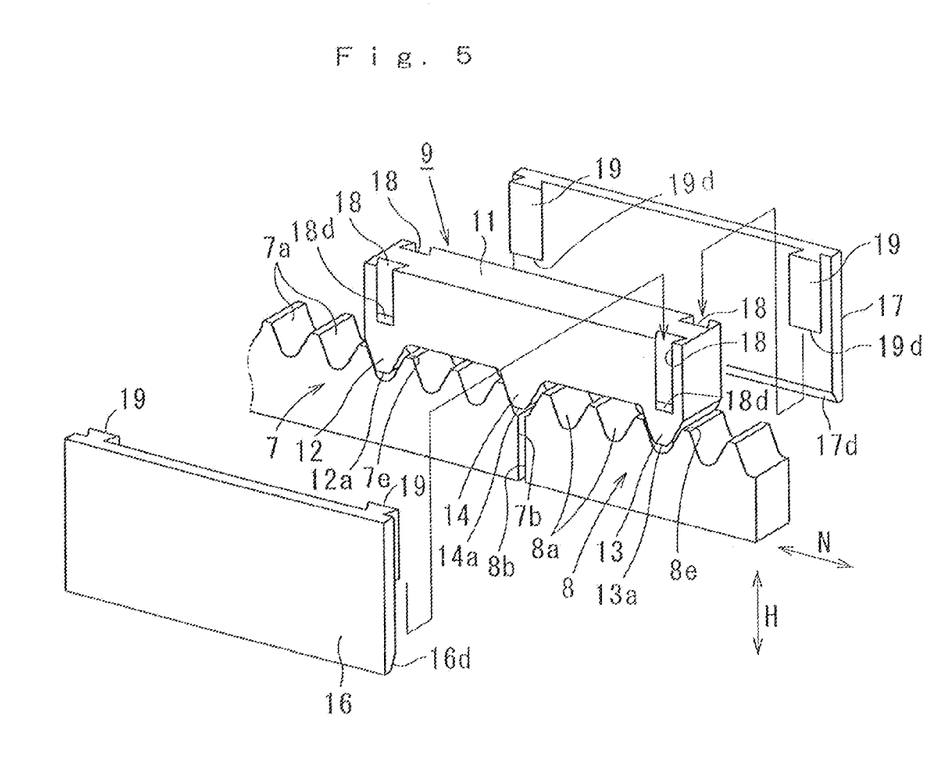
FIG. 5 is a perspective view of the rack extension jig device used to align the neighboring racks straight according to a third embodiment of the invention.
Figure 6:
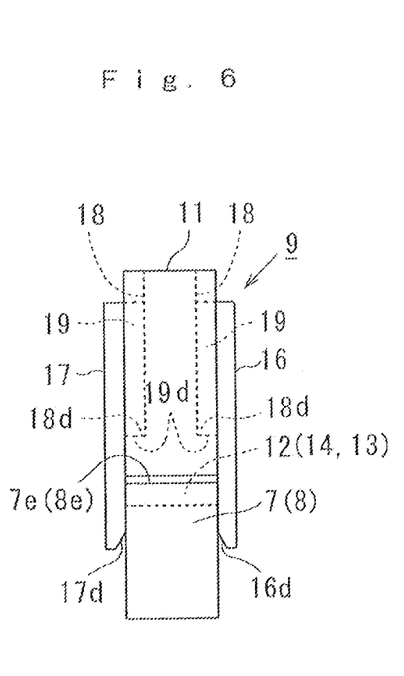
FIG. 6 is a side elevational view of the rack extension jig device.

FIGS. 5 and 6 show a third embodiment of the invention in which a mortise joint structure is provided instead of using the securement bolts 18a and nuts 19a.

As shown in FIG. 5, the elevational sides of the hand grip body 11 have two streaks of mortise grooves 18 in a direction perpendicular to a lengthwise direction N of the neighboring racks 7, 8. Each of the adjustment side plates 16, 17 has tenon ridges 19 slidably placed in the respective mortise grooves 18 as shown in FIG. 6. Each lower end of the mortise grooves 18 has a close-ended stopper 18d which engages with a lower end 19d of the tenon ridge 19.

With the adjustment side plates 16, 17 secured by placing the tenon ridges 19 slidably in the respective mortise grooves 18, it is possible to make the adjustment side plates 16, 17 cost-effective with a simplified structure.

In the third embodiment of the invention, the mortise grooves 18 is formed on the hand grip body 11, and the tenon ridges 19 are formed on the adjustment side plates 16, 17. However, the mortise grooves 18 may be conversely formed on the adjustment side plates 16, 17, and the tenon ridges 19 may be formed on the hand grip body 11.

It is to be noted that the mortise grooves 18 and the tenon ridges 19 may be arranged slantwise against the lengthwise direction N in a fashion to form a predetermined angle with the neighboring racks 7, 8.

Figure 7:
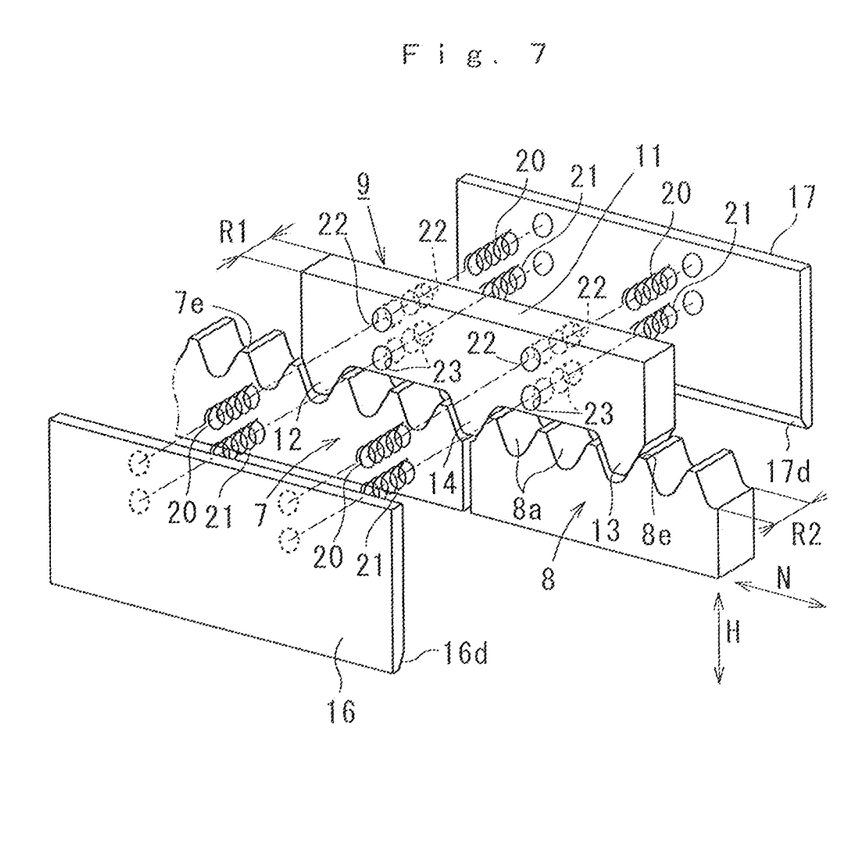
FIG. 7 is a perspective view of the rack extension jig device used to align the neighboring racks straight according to a fourth embodiment of the invention.
Figure 8:
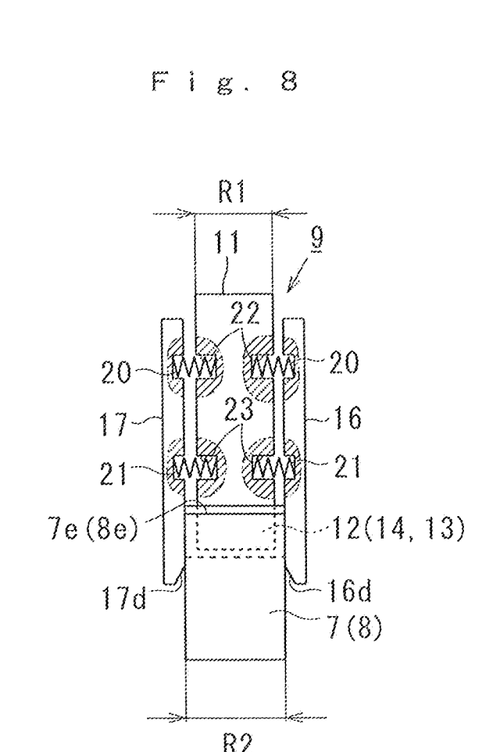
FIG. 8 is a side elevational view of the rack extension jig device but partly sectioned.

FIGS. 7 and 8 show a fourth embodiment of the invention in which a compressive helical spring 20 and a tensile helical spring 21 are provided as elastic members instead of the securement bolts 18a and the nuts 19a.

As shown in FIG. 7, upper right and left sides of the hand grip body 11 have first bottom-ended holes 22 along a thickness direction of the hand grip body 11, and lower right and left sides of the hand grip body 11 have second bottom-ended holes 23 along the thickness direction of the hand grip body 11.

One end of the compressive helical spring 20 is fixedly accommodated within the first bottom-ended hole 22, and the other end of the compressive helical spring 20 is secured to an inner side of the adjustment side plate 16 (17) as shown in FIG. 8.

One end of the tensile helical spring 21 is fixedly accommodated within the second bottom-ended hole 23, and the other end of the tensile helical spring 21 is secured to an inner side of the adjustment side plate 16 (17).

Such is the structure that the compressive helical spring 20 is placed at a distal side of the racks 7, 8 between the hand grip body 11 and the adjustment side plate 16 (17).

Meanwhile, the tensile helical spring 21 is placed at a proximal side of the racks 7, 8 between the hand grip body 11 and the adjustment side plate 16 (17).

In the fourth embodiment of the invention, when a thickness R2 of the racks 7, 8 is dimensionally greater than a thickness R1 of the hand grip body 11, the adjustment side plates 16, 17 sandwiches the hand grip body 11 to elastically deform the compressive helical spring 20 in its compressive direction, while at the same time, elastically deforming the tensile helical spring 21 in its tensile direction, so that the adjustment side plates 16, 17 bring their lower portions into engagement with the respective sides of the contact portion between the neighboring racks 7, 8.

With the use of the compressive and tensile helical springs 20, 21, it is possible to apply the adjustment side plates 16, 17 to the racks 7, 8, the thickness R2 of which is greater than the thickness R1 of the hand grip body 11.

Figure 9:
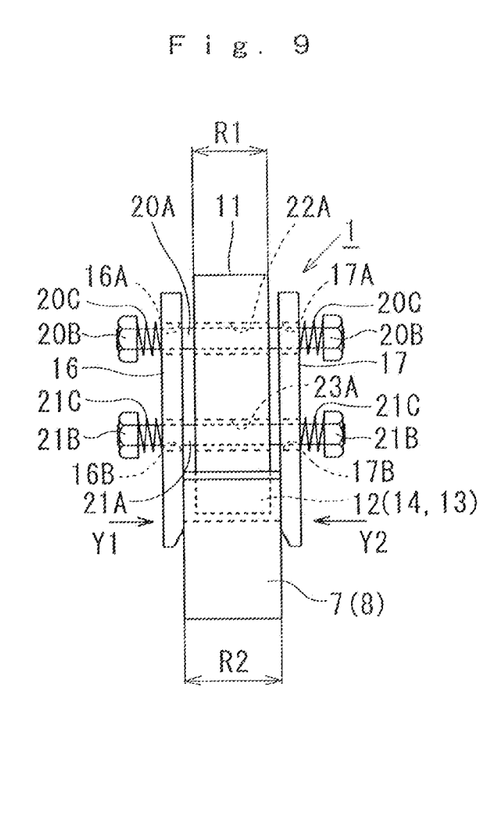
FIG. 9 is a side elevational view of the rack extension jig device according to a fifth embodiment of the invention.

FIG. 9 shows a fifth embodiment of the invention in which screw bolts 20A, 21A are provided instead of the compressive and tensile helical springs 20, 21, and perforation holes 22A, 23A are provided instead of the bottom-ended holes 22, 23.

The adjustment side plates 16, 17 have upper through-holes 16A, 17A corresponding to the perforation holes 22A, and having lower through-holes 16B, 17B corresponding to the perforation holes 23A.

The screw bolt 20A passes through the upper through-hole 16A, the perforation hole 22A and the upper through-hole 17A, while at the same time, the screw bolt 21A passes through the lower through-hole 16B, the perforation hole 23A and the lower through-hole 17B.

To right and left ends of the screw bolt 20A, a nut 20B is attached through a compressive helical spring 20C provided as an elastic member. To right and left ends of the other screw bolt 21A, another nut 21B is attached through a compressive helical spring 21C provided as an elastic member.

By adjustedly tightening and loosening the nut 20B (21B) against the screw bolt 20A (21A), it is possible to regulate an urging force which exerts the compressive helical springs 20C, 21C against the adjustment side plates 16, 17 to make the side plates 16, 17 tightly engage with the respective sides of the racks 7, 8 as shown at arrows Y1, Y2 in FIG. 9.

Figure 10:
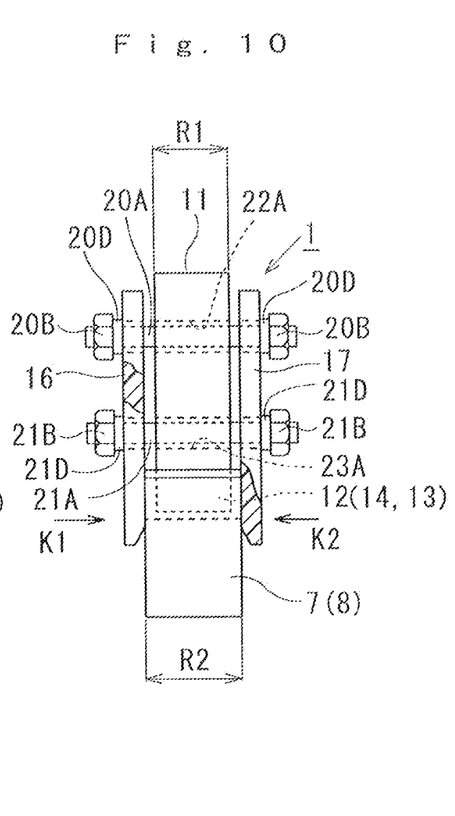
FIG. 10 is a side elevational view of the rack extension jig device according to a sixth embodiment of the invention.

FIG. 10 shows a sixth embodiment of the invention in which washers 20D, 21D are provided instead of compressive helical springs 20C, 21C, and the adjustment side plates 16, 17 are formed by a synthetic resin such as e.g., rubber or polyurethane.

By adjustedly tightening or loosening the nuts 20B, 21B, it is possible to regulate an urging force which the adjustment side plates 16, 17 exert against the respective sides of the racks 7, 8 as shown at arrows K1, K2 in FIG. 10.

As alternatives of the synthetic resin for the adjustment side plates 16, 17, raised herein are polyacetal, polyamide (PA), polycarbonate (PC), polyphenyleneether (PPE), polybutyleneterephthalate (PBT), polyethyleneterephthalate (PET), polyethylene (PE) and syndiotactic polystyrene (SPS).

Figure 11:
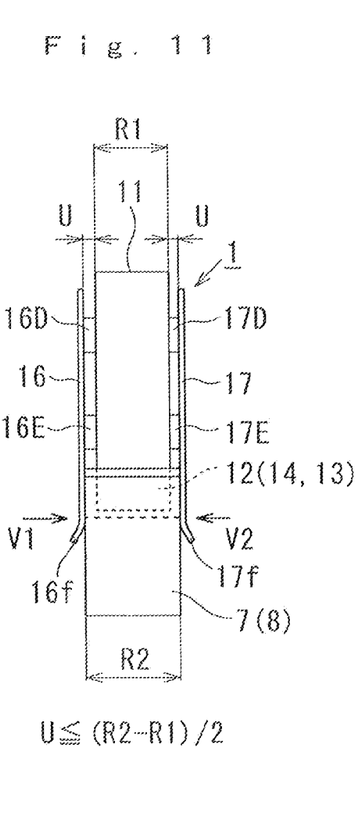
FIG. 11 is a side elevational view of the rack extension jig device according to a seventh embodiment of the invention.

FIG. 11 shows a seventh embodiment of the invention in which the screw bolts 20A, 21A, the compressive helical springs 20C, 21C and the nuts 20B, 21B are omitted with the adjustment side plates 16, 17 formed by a rectangular leaf spring.

One adjustment side plate 16 is fixedly secured to a left side of the hand grip body 11 through upper and lower spacers 16D, 16E, while at the same time, the other adjustment side plate 17 is fixedly secured to a right side of the hand grip body 11 through upper and lower spacers 17D, 17E.

The adjustment side plates 16, 17 determine each thickness U of the spacers 16D, 16E (17D, 17E) to be equal to or less than half a difference (R2−R1) between the thickness R2 of the racks 7, 8 and the thickness R1 of the hand grip body 11 $\{U \leq (R2-R1)/2\}$.

By adjusting the thickness U of the spacers 16D, 16E (17D, 17E), it is possible to regulate an urging force which exerts the adjustment side plates 16, 17 against the respective sides of the racks 7, 8 as shown at arrows V1, V2 in FIG. 11.

Each of the adjustment side plates 16, 17 has a lower end which is bent outward to have guide flaps 16f, 17f, thereby making it ready to slide the adjustment side plates 16, 17 smoothly against the respective upper ends 7e, 8e of the racks 7, 8 when pushing the adjustment side plates 16, 17 against the contact portion between the neighboring racks 7, 8.

Figure 12:
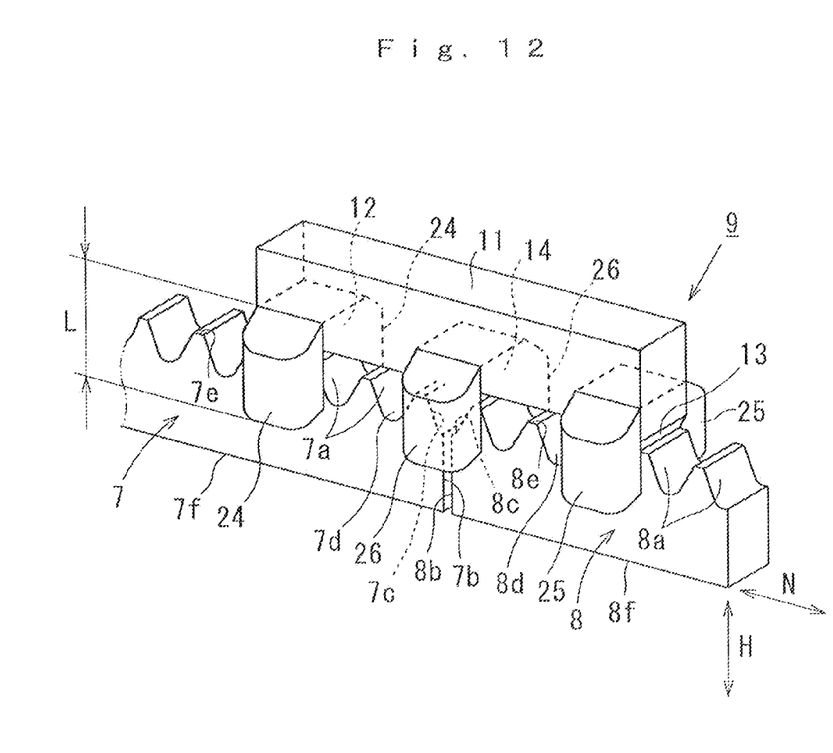
FIG. 12 is a perspective view of the rack extension jig device used to align the neighboring racks straight according to an eighth embodiment of the invention.
Figure 13:
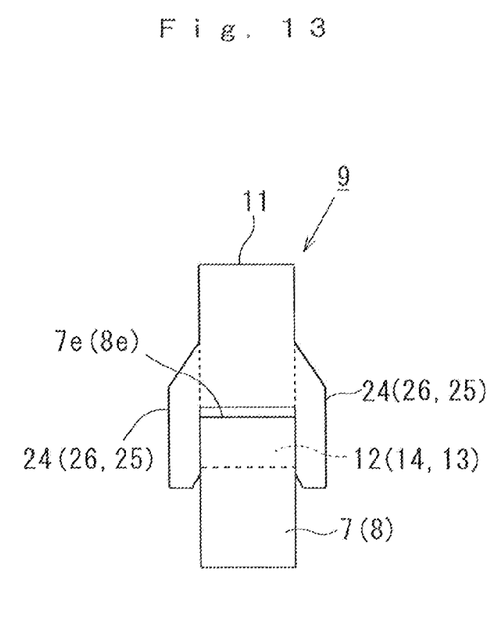
FIG. 13 is a side elevational view of the rack extension jig device.

FIG. 12 shows an eighth embodiment of the invention which differs from the first embodiment of the invention in that the hand grip body 11 has engagement tabs 24-26 extending from each of the respective tooth projections 12-14.

Namely, each of the front tooth projection 12, the rear tooth projection 13 and the intermediate tooth projection 14 has the respective elevational sides to serve as engagement tabs 24-26 which engage with the respective sides of the neighboring racks 7, 8 at the contact portion between the neighboring racks 7, 8 so as to align the racks 7, 8 straight.

With the engagement tabs 24-26 provided on the tooth projections 12-14, it is possible to positively align the neighboring racks 7, 8 straight with a simplified structure.

By visually observing that the engagement tabs 24-26 engage with the respective elevational sides of the neighboring racks 7, 8, it is possible to confirm that the racks 7, 8 are aligned straight at the predetermined pitch interval T at the contact portion between the neighboring racks 7, 8.

The engagement tabs 24-26 has an extension length L which is dimensionally acceptable so long as the engagement tabs 24-26 engage with the respective sides of the neighboring racks 7, 8. The engagement tabs 24-26 may be lengthened until the tabs 24-26 reach the lowest ends 7f, 8f of the racks 7, 8.

MODIFICATION FORMS (a) Among the front tooth projection 12, the rear tooth projection 13 and the intermediate tooth projection 14 each provided on the hand grip body 11, the intermediate tooth projection 14 may be omitted. Between the front tooth projection 12 and the rear tooth projection 13, a plurality of tooth projections may be provided instead of only one intermediate tooth projection 14.

(b) Instead of the front and rear tooth projections 12, 13 provided as the tooth projections, three, four or more tooth projections may be provided.

(c) The tooth projections 12, 13, 14 may have the protracted ends 12a, 13a, 14a formed by a magnetic material, so that the protracted ends 12a, 13a, 14a magnetically stick to the respective rack teeth 7a, 8a and half tooth surfaces 7c, 8c when the hand grip body 11 brings the tooth projections 12, 13, 14 into engagement with the respective rack teeth 7a, 8a and half tooth surfaces 7c, 8c.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

What is claimed is:

1. In a rack extension jig device which is used to add a rack or racks when aligning a plurality of racks straight along lengthwise directions of said racks so as to drive a pinion along said racks, said rack extension jib device comprising:

a hand grip body having at least two tooth projections including a front tooth projection and a rear tooth projection, said front tooth projection engaging with a tooth surface of one rack and said rear tooth projection engaging with a tooth surface of another rack among two neighboring racks;

said tooth projections being directed in a coplanar relationship with each elevational direction of said racks when aligned lengthwise straight, said tooth projections engaging with the respective racks so as to determine a pitch interval among said two neighboring racks; and said hand grip body having an adjustment side plate which engages with respective elevational sides of said neighboring racks at the contact portion between said neighboring racks when aligned straight.

2. The rack extension jig device according to claim 1, wherein said hand grip body has an intermediate tooth projection between said front tooth projection and said rear tooth projection, said front tooth projection, said intermediate tooth projection and said rear tooth projection each being directed in a coplanar relationship with an elevational direction of said racks when aligned, said intermediate tooth projection engaging with the neighboring racks at a contact portion between the neighboring racks to align said racks straight.

3. The rack extension jig device according to claim 2, wherein each of said front tooth projection, said intermediate tooth projection and said rear tooth projection have elevational sides to serve as engagement tabs which engages with the respective sides of said neighboring racks at said contact portion between said neighboring racks to align said racks straight.

4. The rack extension jig device according to claim 1, wherein both elevational sides of said hand grip body have a mortise groove provided in a direction perpendicular to the lengthwise direction of said neighboring racks, and said adjustment side plate has a tenon ridge slidably placed in said mortise groove.

5. The rack extension jig device according to claim 1, wherein an elastic member is provided between an upper portion of said adjustment side plate and an upper portion of said hand grip body, so that said adjustment side plates elastically sandwich the neighboring racks at said contact portion between the neighboring racks even when a thickness of said rack is greater than a thickness of said hand grip body.

* * * * *